US012681842B2

(12) United States Patent
Chen et al.

(10) Patent No.: US 12,681,842 B2
(45) Date of Patent: Jul. 14, 2026

(54) AUTOMATIC PORTABLE DEVICE TESTING METHOD AND SYSTEM

(71) Applicant: Visa International Service Association, San Francisco, CA (US)

(72) Inventors: Yuexi Chen, Foster City, CA (US); Kiat Chun Tan, Singapore (SG); Arlene Yap Bernas, Singapore (SG); Alexandre Pierre, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 679 days.

(21) Appl. No.: 17/331,070

(22) Filed: May 26, 2021

(65) Prior Publication Data

US 2021/0374042 A1 Dec. 2, 2021

Related U.S. Application Data

(60) Provisional application No. 63/032,947, filed on Jun. 1, 2020.

(51) Int. Cl.
*G06F 9/44* (2018.01)
*G06F 11/3668* (2025.01)

(52) U.S. Cl.
CPC ........ *G06F 11/3688* (2013.01); *G06F 11/368* (2013.01); *G06F 11/3692* (2013.01)

(58) Field of Classification Search
CPC . G06F 11/3688; G06F 11/368; G06F 11/3692
See application file for complete search history.

(56) References Cited

U.S. PATENT DOCUMENTS

| | | | |
|---|---|---|---|
| 2011/0207108 A1 | 8/2011 | Dorman | |
| 2011/0302451 A1* | 12/2011 | Smith | G06F 11/3672 |
| | | | 709/248 |

(Continued)

FOREIGN PATENT DOCUMENTS

| | | |
|---|---|---|
| CN | 104268079 A | 1/2015 |
| CN | 107251582 A | 10/2017 |

(Continued)

OTHER PUBLICATIONS

European Search Report mailed Oct. 26, 2021 for EP Patent Application No. 21176752.0, 7 pages.

(Continued)

*Primary Examiner* — Bradley A Teets
*Assistant Examiner* — Lenin Paulino
(74) *Attorney, Agent, or Firm* — Kilpatrick Townsend & Stockton LLP

(57) ABSTRACT

Systems and methods of testing portable access devices are described. One method includes receiving, by a reader controller, a configuration file configuration data and providing, by the reader controller, a configuration command associated with configuration data to an access application on an access device. The method also includes configuring the access application on the access device for an interaction scenario based on the configuration command and initiating the interaction scenario between the access device and a test tool. The method also includes receiving, by the access device, interaction data from the test tool and processing, by the access device, the interaction data, thereby generating test output data. The method also includes providing, by the access device, the test output data to the reader controller and sending, by the reader controller, the test output data to the test tool.

20 Claims, 8 Drawing Sheets

(56)                    References Cited

U.S. PATENT DOCUMENTS

| | | | |
|---|---|---|---|
| 2013/0098984 A1* | 4/2013 | Shenker ................... | G06K 7/01 |
| | | | 235/375 |
| 2014/0344779 A1* | 11/2014 | Hargett, Jr. .............. | G06F 8/36 |
| | | | 717/107 |
| 2015/0150123 A1* | 5/2015 | Be'ery ................ | H04L 41/0686 |
| | | | 726/22 |
| 2015/0161586 A1 | 6/2015 | Bailey | |
| 2016/0248479 A1 | 8/2016 | Bellenger et al. | |
| 2017/0270717 A1* | 9/2017 | Somani .................. | G06Q 10/06 |
| 2019/0196935 A1 | 6/2019 | Edwards et al. | |
| 2019/0207953 A1* | 7/2019 | Klawe .................... | G06F 21/57 |
| 2019/0347189 A1* | 11/2019 | Chen .................... | G06Q 20/341 |
| 2020/0090176 A1* | 3/2020 | Mestré ................. | H04L 9/3066 |
| 2020/0159653 A1* | 5/2020 | Raghupathy ........ | G06F 11/3696 |
| 2021/0067202 A1* | 3/2021 | Rule .................... | G06Q 20/352 |
| 2021/0400512 A1* | 12/2021 | Agarwal ............. | H04M 7/0078 |
| 2022/0091949 A1* | 3/2022 | Chen .................... | G06F 11/261 |

FOREIGN PATENT DOCUMENTS

| | | | | |
|---|---|---|---|---|
| CN | 107748853 A | * | 3/2018 | .............. G06K 7/00 |
| WO | 2018/144036 A1 | | 8/2018 | |
| WO | 2019/195676 A1 | | 10/2019 | |
| WO | 2020/142512 A1 | | 7/2020 | |

OTHER PUBLICATIONS

CN202110599728.0 , "Office Action", Jul. 21, 2025, 19 pages.
Application No. KR2021-70306 , Office Action, Mailed On Jan. 30, 2026, 10 pages.
Application No. CN202110599728.0 , Notice of Decision to Grant, Mailed on Mar. 2, 2026, 8 pages.

* cited by examiner

AUTOMATIC PORTABLE DEVICE TESTING METHOD AND SYSTEM

CROSS-REFERENCE TO RELATED APPLICATIONS

This application is a non-provisional of and claims priority to U.S. Provisional Application No. 63/032,947, filed on Jun. 1, 2020, which is herein incorporated by reference.

BACKGROUND

Conventional access devices such as badge readers, ticket readers, and point of sale devices are specifically manufactured for their intended purpose. They are built and then extensively tested before they are deployed to the providers that use them.

In recent years, many transaction providers are developing access device solutions that can be incorporated on commercially available mobile devices. For example, some badge reader, ticket reader, and mobile point of sale (mPOS) solutions include deploying applications to smartphones that support NFC (near field communications). Such solutions allow mobile devices to be used as access devices.

However, one shortcoming of using applications on mobile devices to turn them into access devices is that the applications need to be extensively tested before they can be used. Application software has a rapid release cycle and a short lifetime compared to traditional access device readers and software. This is problematic, since traditional access devices may need to run through and pass more than 1500 test cases before they are certified. In the conventional testing of access devices, a probe may be used to tap an access device to be tested each time that a test case is run on the access device. Thus, conventional testing methods can take a significant amount of time and can be burdensome.

Embodiments of the invention address these and other problems individually and collectively.

BRIEF SUMMARY

One embodiment includes a method comprising: configuring an access application on an access device for an interaction scenario based on a configuration command received from a reader controller; conducting the interaction scenario between the access device and a test tool; receiving, by the access device, interaction data from the test tool; processing, by the access device, the interaction data, thereby generating test output data; and providing, by the access device, the test output data to the reader controller, which sends the test output data to the test tool. The test output data is compared to expected test output data to determine if the access device is capable of conducting the interaction scenario.

Another embodiment of the invention includes an access device comprising: a processor; and a non-transitory computer readable medium, the non-transitory computer readable medium comprising code, executable by the processor to cause the process to perform operations including: configuring an access application on the access device for an interaction scenario based on a configuration command received from a reader controller; conducting by the access device, the interaction scenario between the access device and a test tool; receiving interaction data from the test tool; and processing the interaction data, thereby generating test output data; and providing the test output data to the reader controller, which sends the test output data to the test tool.

The test output data is compared to expected test output data to determine if the access device is capable of conducting the interaction scenario.

Another embodiment includes a method comprising: receiving, by a test tool, a test plan; storing, by the test tool, the test plan; determining, by the test tool, a configuration file comprising configuration data from the test plan; providing, by the test tool, the configuration file comprising the configuration data to a reader controller, which provides a configuration command associated with configuration data to an access application on an access device to configure the access application for an interaction scenario between the access device and the test tool; conducting the interaction scenario between the access device and the test tool; and receiving test output data from the access device. The test output data is compared to expected test output data to determine if the access device is capable of conducting the interaction scenario.

Another embodiment of the invention includes a test tool comprising a processor; and a computer readable medium coupled to the processor. The computer readable medium comprises code, executable by the processor for performing operations including: receiving, by a test tool, a test plan; storing, by the test tool, the test plan; determining, by the test tool, a configuration file comprising configuration data from the test plan; providing, by the test tool, the configuration file comprising the configuration data to a reader controller, which provides a configuration command associated with configuration data to an access application on an access device to configure the access application for an interaction scenario between the access device and the test tool; conducting the interaction scenario between the access device and the test tool; and receiving test output data from the access device. The test output data is compared to expected test output data to determine if the access device is capable of conducting the interaction scenario.

Another embodiment includes a method comprising: receiving, by a reader controller; a configuration file configuration data; providing, by the reader controller, a configuration command associated with configuration data to an access application on an access device, which configures the access application on the access device for an interaction scenario based on the configuration command; initiating the interaction scenario between the access device and a test tool, the access device receiving interaction data from the test tool, processing the interaction data, and generating test output data; receiving the test output data from the access device; and sending, by the reader controller, the test output data to the test tool. The test output data is compared to expected test output data to determine if the access device is capable of conducting the interaction scenario.

Further details regarding embodiments of the invention can be found in the Detailed Description and the Figures.

DETAILED DESCRIPTION

Figure 1:
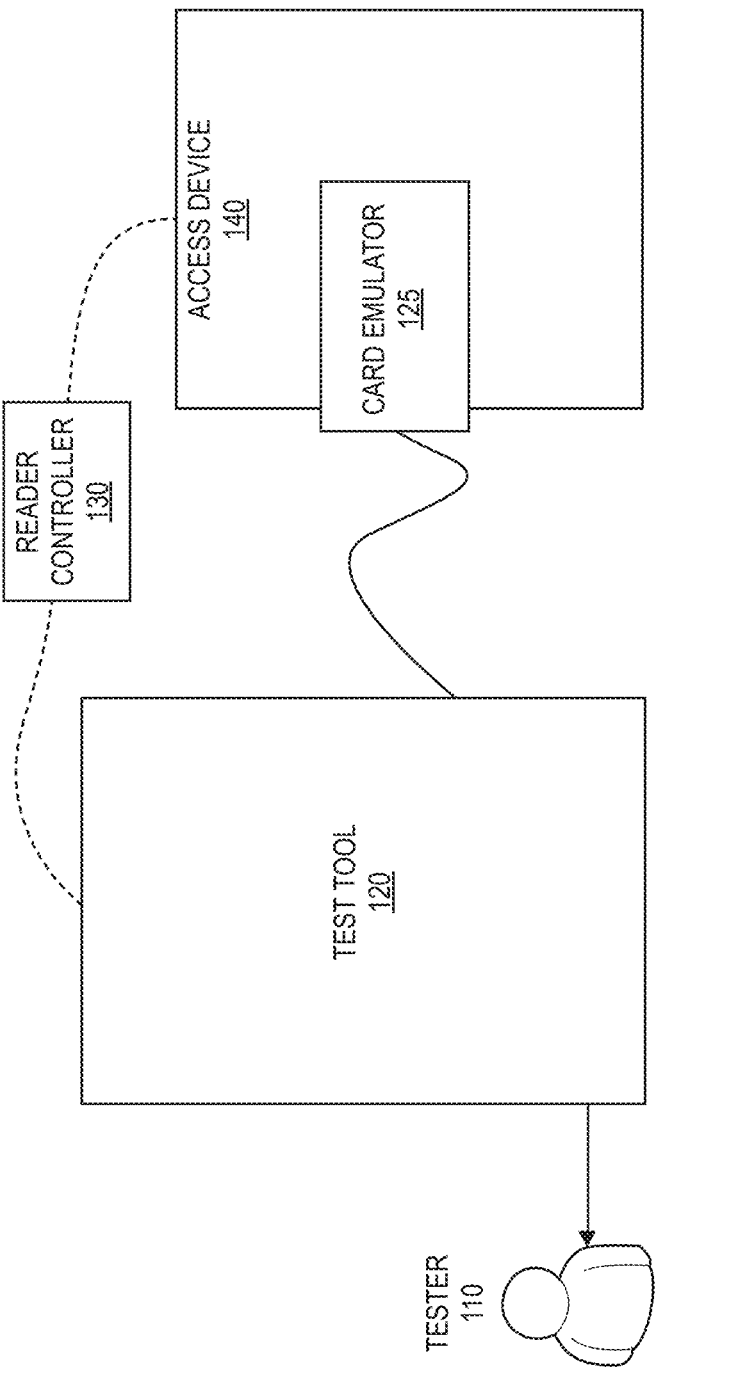
FIG. 1 shows a block diagram of a system according to embodiments.

Prior to discussing embodiments of the invention, a discussion of some terms may be helpful.

A "portable device" may include a device that can be easily transported. For example, a portable device be used by a user can interact with an access device in order to conduct an interaction. Examples of portable devices include payment devices, membership devices, access cards, identification devices, etc.

A "mobile device" can include a device that can be carried by a user. Examples of mobile devices can include a smartphone, a tablet computer, etc. In some embodiments, a mobile device can comprise an interaction application and a kernel. In some embodiments, a mobile device can be a mobile access device. A mobile access device can be used by a resource provider or a person working for a resource provider to confirm that a user that uses a portable device has authority to obtain access to a resource (e.g., a location, good, service, data, etc.) provided by the resource provider (e.g., a transit operator, a venue operator, a merchant, etc.).

A "test computer" can include a computer that can conduct tests. A test computer can comprise a processor and a computer readable medium comprising a reader controller.

A "test tool" can be used to interact with another entity (e.g., an access device) to perform a test. In some cases, a test tool can include an NFC emulator, so that the test tool can emulate a device such as a contactless card or contactless phone.

An "interaction" may include a reciprocal action or influence. An interaction can include a communication, contact, or exchange between parties, devices, and/or entities. Example interactions include a transaction between two parties and a data exchange between two devices.

"Interaction data" can include data related to an interaction. In some embodiments, interaction data can be transaction data. Transaction data can comprise a plurality of data elements with data values associated with a transaction. In some embodiments, interaction data can include identifiers, credentials, amounts, dates, times, etc.

An "interaction scenario" may include plan for interaction. An example of an interaction scenario may be a test case. An interaction, may be for example, one or more communications (interaction input and output messages) that may occur between an access device and a test tool. The set and sequence of communications may be an interaction scenario.

A "test plan" may include a plurality of interaction scenarios or test cases. A test plan may contain a number of test cases which may be used to test whether a particular access application on an access device is functioning properly.

An "interaction input message" may be a communication received during an interaction. For example, a message sent by an mobile device may be an interaction input message for a receiving portable device. One example of an interaction input message can include an APDU (application protocol data unit) command.

An "interaction output message" may be a communication sent during an interaction that is responsive to an interaction input message. One example of an interaction output message can include an APDU response sent by a portable device, in response to receiving an APDU command.

A "test interaction" may be an investigative interaction. In some embodiments, a test interaction may be conducted to determine information about how an interaction system is functioning. For example, different test interactions can be designed to determine whether or not interactions will be processed correctly when initiated by different types of portable devices. A test interaction can involve sending certain types of information during an interaction communication session, to an mobile device, in order to test how the information is processed. Some test interactions can be designed to check for errors in interaction processing. For example, some test interactions can check the response from the mobile device when a test computer provides incorrect information for an interaction. A properly functioning mobile device would provide a predicated response (e.g., a certain error message) after receiving the incorrect information.

An "interaction report" may include information related to one or more prior interactions. An interaction report can have a description of how a message in an interaction was processed. For example, an interaction report can have information that was sent and received, and whether the interaction was successful. An interaction report can also include notes about problems, missing information, delays, or other issues that took place during the interaction.

A "reader controller" can be a device and/or software that can provide at least some measure of control an access device, such as during a testing process.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

FIG. 1 shows a high level diagram of a system according to embodiments. FIG. 1 shows the roles of three entities in test automation: a test tool 120, a reader controller 130, and an access device 140. The access device 140 may be a device that grants access to a resource such as a building badge access reader, a ticket reader, or a point of sale terminal.

The test tool 120 can communicate with the reader controller 130 to deliver transaction configurations and receive transaction outcomes. The test tool 120 can also include a card emulator 125 (e.g. a card probe, software that emulates card functions, or a physical card) that is to execute each test case. The test tool 120 can also include a test computer with a display that has a user interface (UI), which can provides a tester 110 with the ability to communicate with or control the test tool 120. The user interface can display test steps and instructions to perform tests, prompts to confirm statuses of tests, events and visual checks, and test verdicts. The test tool 120 can also validate APDUs (application protocol data units) and transaction outcomes.

The reader controller 130 can communicate with the test tool 120 to receive a transaction configuration data and pass it to the access device 140. A transaction configuration data may include data that causes the access device 140 to operate under a predetermined type of circumstance. For example, if the access device 140 is a point of sale terminal, then the transaction configuration data may include data that causes the access device 140 to simulate a twenty dollar payment transaction, such as when a merchant enters an amount of twenty dollars into the access device 140 and then waits for the receipt of an account number from a portable device. In another example, if the access device 140 is a ticket reader, then the configuration data may configured the access device 140 to interact with a specific type of ticket format at a certain time of the day.

After the card emulation device 125 provides any requested data (e.g., an account number, a user identification number, etc.) to the access device 140, the reader controller 130 can also retrieve data representing the transaction outcome from the access device 140. The reader controller 140 may also subsequently submit this information to the test tool 120. The transaction outcome can be correct or erroneous, and the transaction outcome can be evaluated by the test tool 120. For example, in the case of a payment transaction, a correct transaction outcome may be the generation or an authorization request message or some other type of message by the access device 140.

Figure 2:
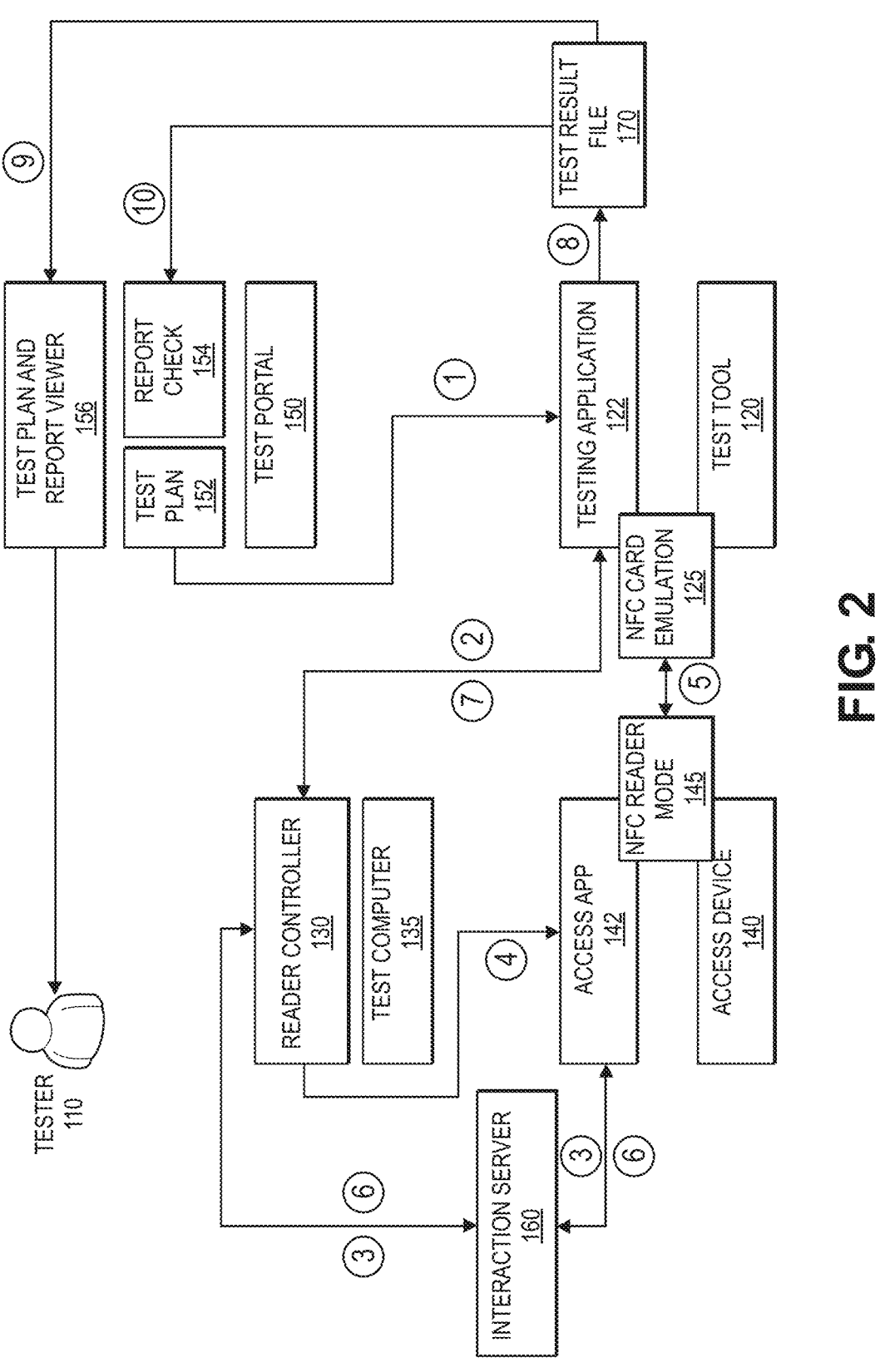
FIG. 2 shows a block diagram and sequence flow of a system according to embodiments.

FIG. 2 shows another block diagram of a system according to another embodiment. FIG. 2 shows a tester 110 which can be a person or a machine. The system can a test tool 120, a reader controller 130, and an access device 140. These components are described above with respect to FIG. 1. The system also includes a test portal 150, a test computer 135 with a reader controller 130, an interaction server 160, and a test result file 170.

In some embodiments, the test tool 120 may be a mobile device such as a smartphone. The test tool 120 may include a testing application 122. The test tool 120 may have an NFC card emulation device 125, which may include hardware and/or software suitable for allowing the test tool 120 to emulate an NFC card. Note that although NFC is discussed as an example, other short range wireless communication mechanisms such as Wi-Fi, Bluetooth, IR, etc., or even contact based communication mechanisms may be used in embodiments.

The reader controller 130 may be hosted on a test computer 135. The test computer may be a personal computer such as a laptop or desktop computer, which may be in communication with the interaction server 160 and the access device 140.

In some embodiments, the access device 140 may be a mobile device such as a smartphone. The access device 140 may include an access application 142. The access application 142 can be a building or event access application, a mobile point of sale application, etc. The access application 142 in the access device 140 can communicate with an interaction server 160. The access device 140 can also include an NFC reader 145, which can provide for the ability to read data from a portable device using NFC.

The test portal 150 can provide test plans and certifications for the access application 142 to be tested. In some embodiments, the test portal 150 can include a test plan 152, a report check 154, and test plan and report viewer 156. The test plan 152 can be one of many test plans, each of which has test cases (test scenarios) for testing access devices and access applications. The test plans can be stored in a test plan component in the test portable 150. The report check component 154 can receive test results from the access device 140 or the access application 142. The test results may in a test result file 170. The report check component 154 may also evaluate the test results and may approve or not approve of the access device 140 or the access application 142. The test plan and report viewer 156 can provide visualizations of the test plan 152 and the test result file 170 for the tester 110.

In some embodiments, the test portal 150 may be embodied by a remote server computer running a Website that is used or accessed by the tester 110 that uses a user device (not shown). The test portal 150 may communicate with the testing application 122 on the test tool 120 via a communication network.

Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like.

The access device 140 and the test tool 120 can be smartphones, tablet computers, or similar commercially available devices. For example, the access device can be a first mobile phone and the test tool 120 can be a second mobile phone. They can be at the same location and can be proximate (e.g., within 1 inch or in contact with each other) to each other during testing. Because the access device 140 and the test tool 120 can be commercially available devices such as smartphones, embodiments of the invention can be readily implemented by a resource provider that wishes to install and certify an access application 142 on an access device 140.

The tester 110 that operates a user device, the test computer 135, the test portal 150, and the test server 160 could be at the location where the access device 140 and the test tool 120 are located. In other embodiments, one or more of these entities be may remotely located with respect to each other, and/or the access device 140 and the test tool 120.

Continuing with reference to FIG. 2, a method for testing an access application 142 on an access device 140 can be described.

In step 1, the tester 110 or some other entity can launch the testing application 122. The testing application 122 can check for and download the latest test plan 152 version to the test tool 120 from the test portal 150. The tester 110 or some other entity can operate the test tool 120 and use it to contact the test portal 150 to obtain a test plan 152.

In step 2, the tester 110 can initiate the test in the testing application 122. The test may be done as batch testing, multiple test cases, or as single test cases. The testing application 122 on the test tool 120 can push a first configuration file with first configuration data for a first interaction scenario of the test case to the reader controller 130.

In step 3, the reader controller 130 can receive the first configuration data in the first configuration file and send a first configuration command to the access application 142 to configure the access application 142. In some embodiments, the first configuration command can be sent through the interaction server 160. For example, the first configuration command may configure the access application 142 for a twenty dollar transaction. In this case, the access application 142 may receive data indicating that a transaction for twenty dollars is starting, and may then performs steps to process that twenty dollar transaction. In some cases, the configuration of the access application 142 may include inputting certain values (e.g., transaction amounts) into certain data fields in the access application 142, turning on or off certain routines in the access application 142, modifying or updating the code in the access application 142 so that the access device 140 is expected to operate in a particular manner, etc.

In step 4, the reader controller 130 can initiate the first interaction scenario for the test case. In initiating the first interaction scenario, the reader controller 130 can set the NFC receiver of the access device 140 to an "off" state by sending a first signal to it, and then to an "on" state to emulate a tap by sending a second signal to it. In some embodiments, the signal sent can turn the access device 140 on or off by switching a bit that controls the on or off state of the access device 140. In this way, a single tap interaction can be emulated even if the access device 140 and test tool 120 remain in continuous contact or at consistent spacing (e.g., one half inch) throughout multiple tests. Stated differently, multiple taps (e.g., more than 100 or more than 1000 taps) can be emulated by turning the NFC reader module 145 on and off, even though the access device 140 and the test tool 120 do not move. This removes the need for a human or machine to manually move the test tool 120 for each and every test that is performed, thus improving the speed of testing and reducing the chance of any errors (e.g., mechanical breakdown) associated with the mechanical movement of the test tool 120.

In step 5, the testing application 122 can start card emulation with the NFC card emulation device 125 following a test case APDU flow with access application 142 to conduct the first interaction scenario. In some embodiments, the testing application 122 can start a card emulation in response to receiving a message from the reader controller 130. For example, the message may be a read record command in which a credential such as a user ID or account number is requested from the test tool 120, which simulates a portable device such as a payment card or access badge. The access device 140 can then receive interaction data (e.g., a simulated PAN, dCVV) from the test tool 120, after the test tool 120 receives the message requesting the interaction data.

In step 6, the access application 142 can process the interaction data for the first interaction scenario and create a first test output data. For example, the first test output data may be a transaction confirmation for the twenty dollar transaction, or it could be data relating to the generation of an authorization request message for the twenty dollar transaction. The access application 142 can then provide the first test output data to the reader controller 130. In some embodiments, the first test output data can be sent via the interaction server 160.

In step 7, the reader controller 130 can return the first test output data to the testing application 122. The testing application 122 (or any other downstream device) can then compare the first test output data to a first expected output data to determine if the access device 140 and/or the access application 142 is capable of conducting the first interaction scenario. For example, the expected test output may be in the form of an authorization request message formatted with an account number from the test tool 120 and a twenty dollar amount in an amount data filed in the authorization request message. The test application 122 can compare the received authorization request message format to the expected authorization request message format to determine if the access application 142 is functioning as expected.

The testing application 122 can then repeat steps 2-7 for all the test cases in the test plan or selected by the tester 110. For example, to initiate a second test, the testing application 122 can send a second configuration file to the reader controller 130 with second configuration data. The reader controller 130 can then send a second configuration command to the access application 142 to configure it for a second interaction scenario. For example, the second configuration may be for a $100 transaction. The reader controller 130 can then initiate the second interaction scenario, turning the NFC receiver of the access device 140 off and on to simulate a second tap or physical interaction between the access device 140 and the test tool 120.

In some embodiments, this can be done by sending first and second signals, respectively, as described above in relation to step 4. The read controller 130 may be triggered to send the first signal to turn the NFC receiver off in response to completion of the first test scenario, for example in response to receipt of the first test output data described above in relation to step 6. The read controller may be configured to send the second signal to turn the NFC receiver on in response to sending the second configuration command to the access application 142. For example, the access application 142 may send a confirmation message to the reader controller 130 indicating that the access application has been correctly configured according to the second configuration specified in the second configuration command, and the reader control 130 may be triggered by the confirmation message to send the second signal. In another example, the first and second signals may both be sent in response to the receipt of the confirmation message. In this case, the second signal may be sent after the first signal and separated by a predetermined time interval, which may be less than second, for example between 1 and 100 milliseconds.

The access application 142 then processes the second interaction scenario and generates second test output data, which can be sent to the reader controller 130 and then to the testing application 122. The testing application 122 can then compare the second test output data to second expected output data as noted above.

Note that steps 2-7 can be repeated as many times as desired, for any number of test plans or test scenarios.

In step 8, the testing application 122 generates the test result file 170 after completing the one or more tests selected by the tester 110. The test result file 170 can include the test output data (e.g., the first test output data, the second test output data, etc.) as well as the expected output data (e.g., the first expected output data, the second expected output data, etc.).

In step 9, the tester 110 uploads the test result file 170 from the test tool 120 to the test portal 150 for visualization. The tester 110 can view the test result file 170, see tests that passed and/or failed, and review the test plan 152 to facilitate debugging.

In step 10, the tester 110 uploads the test result file 170 to a report check 154 of the test portal 150 to check if the test was run. The test portal 150 can verify the test result file 170 and confirm that the access application 142 successfully completed the test. If so, the test portal 150 may authorize the access application 142 for public use and distribution.

Before conducting a test, a tester 110 can complete a set up process. The tester 110 can install the test target access application 142 on the access device 140, install the reader controller 130 on the test computer 135, and install the testing application 122 on the test tool 120. The testing application 122 may be downloaded through from a remote application store that stores many applications. The tester 110 configures the testing application 122 to connect to the reader controller 130 through an HTTP connection or some other means. Tester 110 can then put the access device 140 and test tool 120 within range (e.g., back to back) to allow NFC communication between them. The tester 110 can then connect the test computer 135 and the access device 140 (e.g., via USB) to allow the reader controller 130 and the access application 142 to communicate.

In some embodiments, the test plan and test cases used by the reader controller can be autonomously generated. This may be done by the test portal 150. In such embodiments, a machine readable test plan can be generated, e.g. in an XML or in a JSON format, using requirements models and AI (artificial intelligence). A human readable test plan can then be generated from the machine readable test plan. Models and AI are used to generate test cases from the machine readable test plan, the test cases containing test data, test flow and expected output. Machine readable test cases can then be generated, e.g. in XML or JSON. The test plan and test cases can then be hosted by the test portal 150 on a server in on the cloud.

Figure 3:
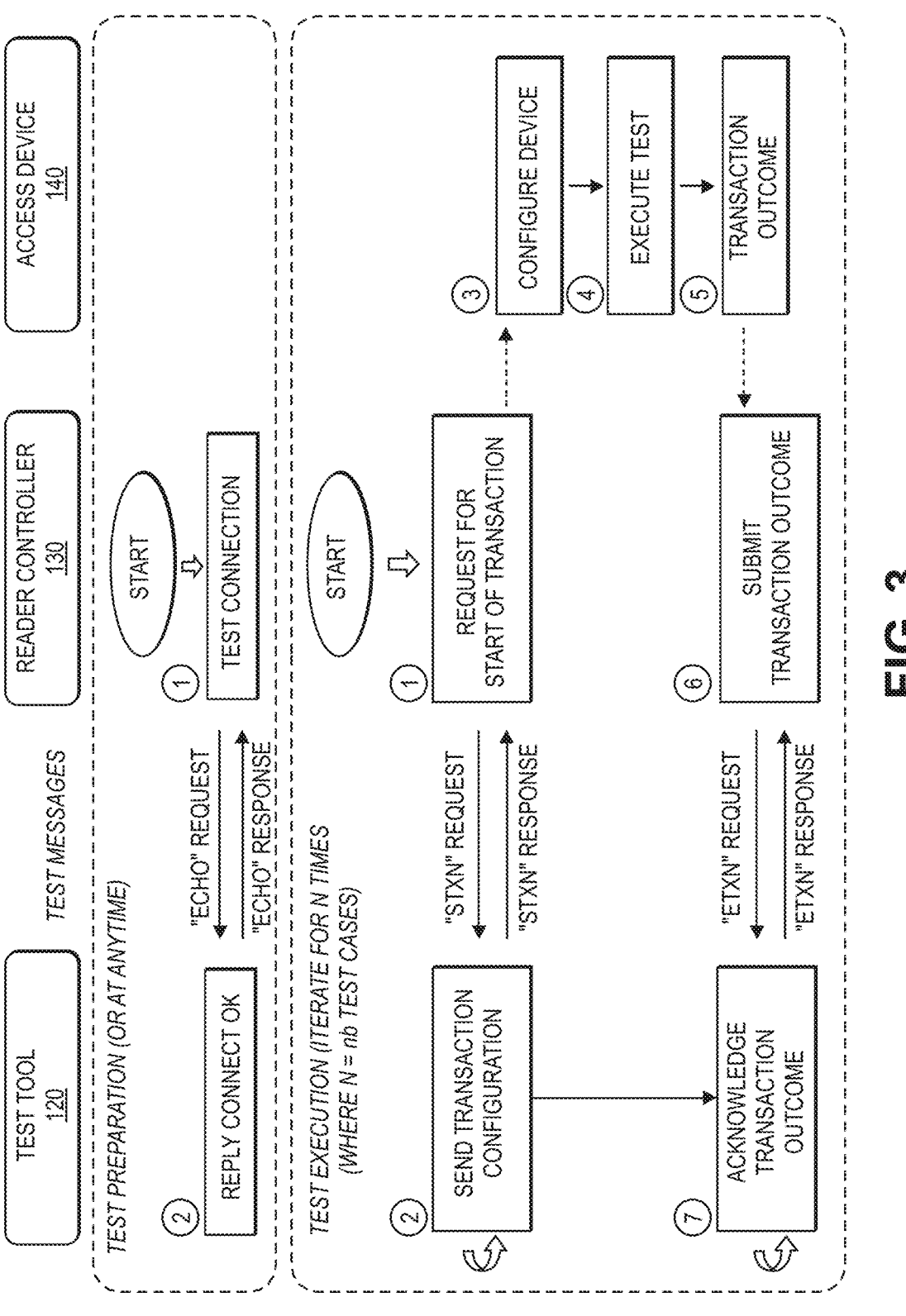
FIG. 3 shows a swim lane diagram of a testing protocol according to embodiments.

FIG. 3 shows a swim lane diagram of a testing process that can occur between the test tool 120, reader controller 130, and access device 140. These components are shown in FIGS. 1 and 2, and the steps may be combined with the steps described above with respect to FIGS. 1 and 2.

In step 1 of test preparation, the reader controller 130 can test the connection with the test tool 120 by sending an "ECHO" request HTTP message with a request line of TRACE/HTTP/1.1 and request headers "Message: ECHO, Host: [IP Address]:[Port], Connection: keep-alive."

In step 2, the test tool 120 can reply with an "ECHO" response HTTP message with status line "HTTP/1.1 [status-code reason-phrase]," response headers "Connection: keep-alive, Content-Type: text/plain" and the response message body can include the content of the ECHO request headers. The status code may be one of 200 OK (success, ACK), 400 Bad Request Format (malformed request syntax), 408 Request Timeout (server is busy, try again later), Others (fail).

After confirming that a connection has been established, the reader controller 130 can initiate a test execution process. The test execution process can be iterated repeatedly (e.g., 1500 times).

In step 1 of test execution, the reader controller 130 can send a request for the start of a transaction to the test tool 120. The request may be a "STXN" request HTTP message with a request line of GET/HTTP/1.1 and request headers "Message: STXN Host: [IP Address]:[Port] Connection: keep-alive."

In step 2, the test tool 120 can send the configuration for the transaction in a "STXN" response HTTP message to the reader controller 130 with a status line of HTTP/1.1 [status-code reason-phrase], request headers "Connection: keep-alive Content-Type: text/plain" and XML data with the configuration data. The status code may be one of 200 OK (success, ACK), 204 No Content (no more test), 400 Bad Request Format (malformed request syntax), 408 Request Timeout (server is busy, try again later), 409 Conflict (multiple updates), or Others (server exception).

In step 3, the reader controller 130 can send a configuration command to the access device 140 to configure the device for the transaction.

In step 4, the access device 140 can execute the test (or test scenario). In executing the test, the access device 140 may interact with the test tool 120 (e.g., by reading an emulated card on the test tool 120).

In step 5, the access device 140 can process the transaction and generate a transaction outcome as test output data. The access device 140 can then send the test output data to the reader controller 130.

In step 6, the reader controller 130 can submit the transaction outcome to the test tool 120 by sending an "ETXN" request HTTP message with a request line of POST/HTTP/1.1, request headers "Message: ETXN, Host: [IP Address]:[Port], Connection: keep-alive, Content-Type: text/plain" and XML data including the test output data.

In step 7, the test tool 120 can acknowledge the transaction outcome by sending an "ETXN" response HTTP message, with a status line HTTP/1.1 [status-code reason-phrase]. The status code may be one of 200 OK (success, ACK), 400 Bad Request Format (malformed request syntax), 408 Request Timeout (server is busy, try again later), 409 Conflict (multiple updates), etc.

Figure 4:
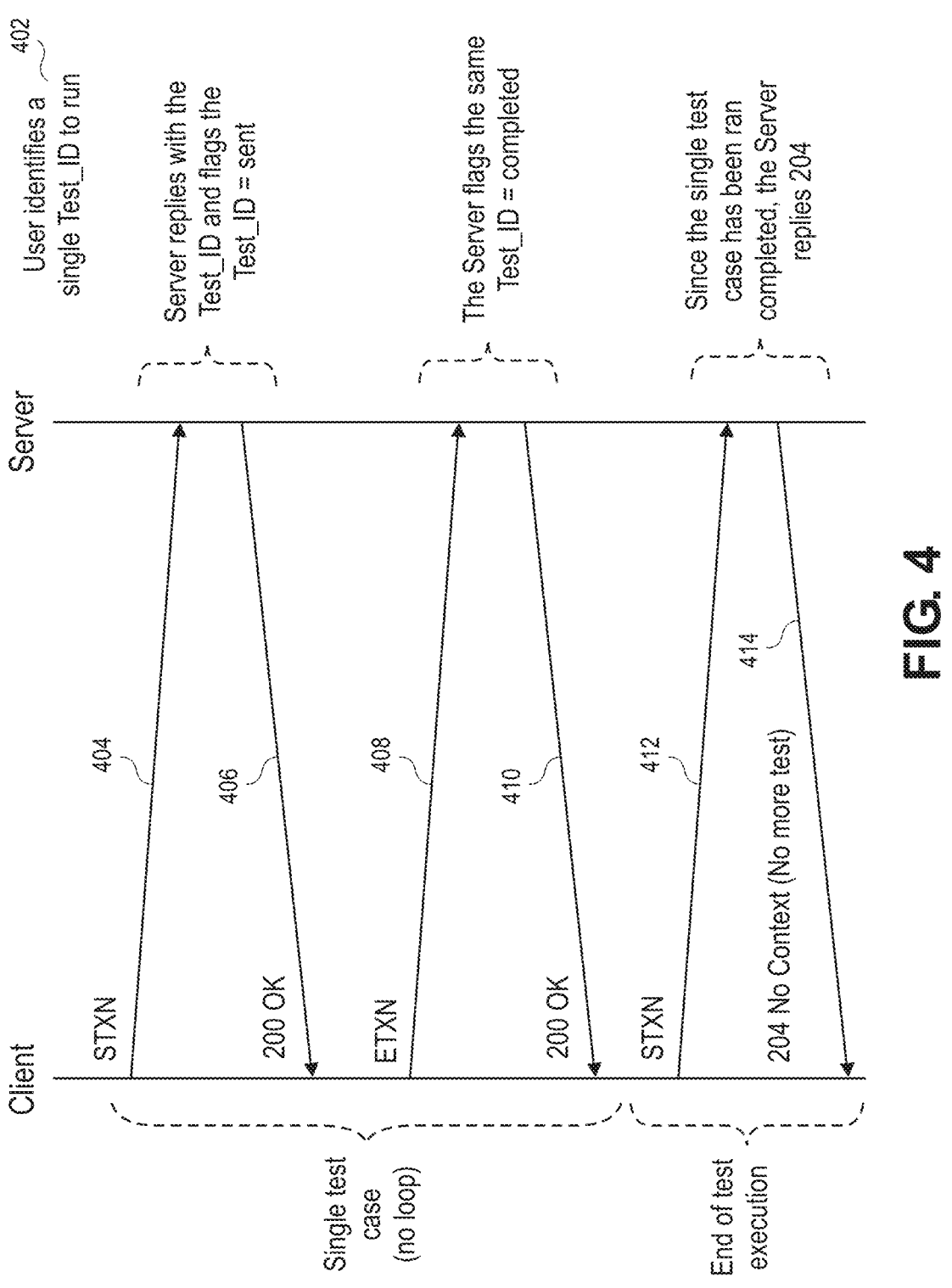
FIG. 4 shows a test execution message flow according to embodiments.
Figure 5:
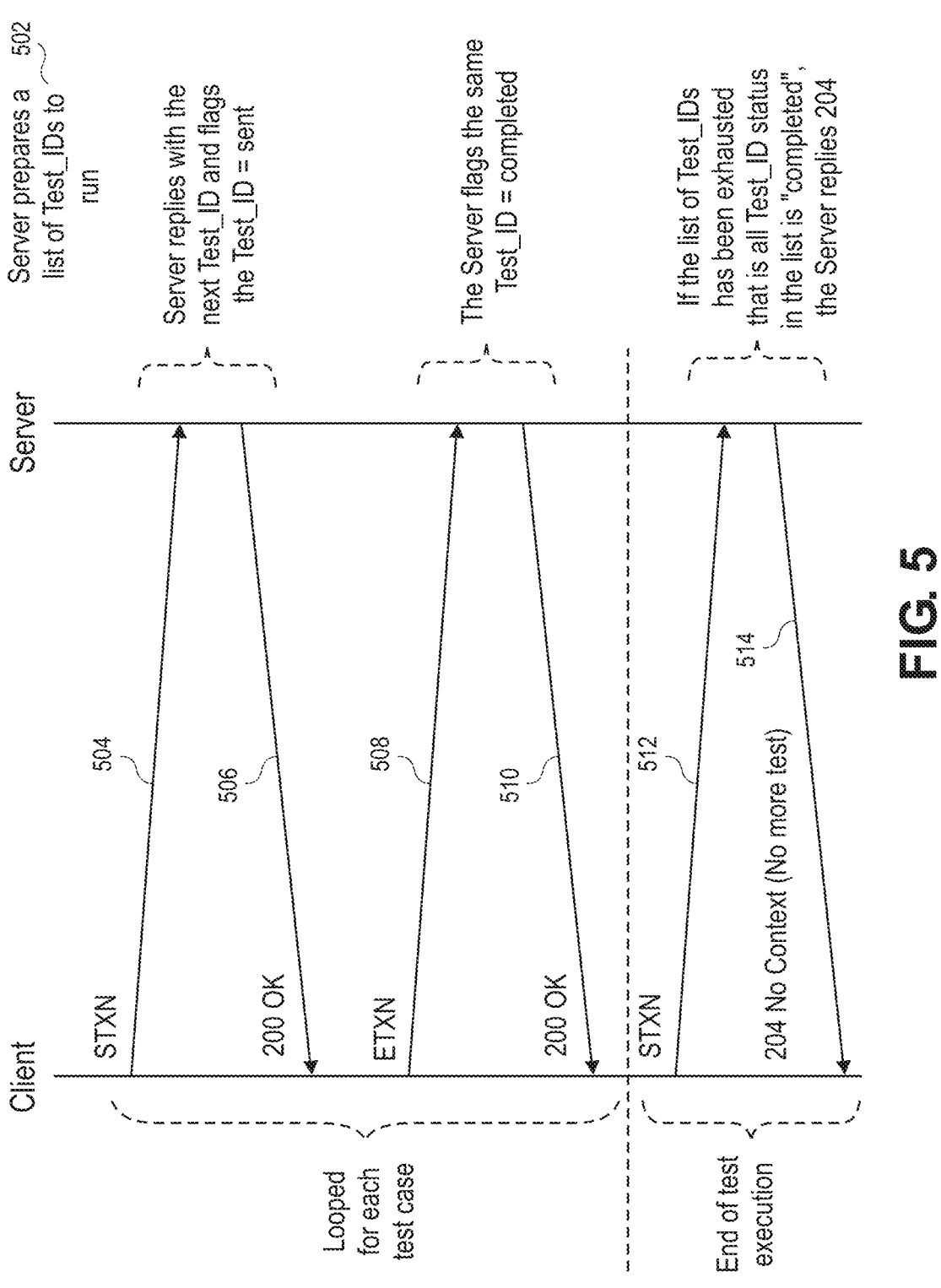
FIG. 5 shows a batch test execution message flow according to embodiments.

FIG. 4 and FIG. 5 show message exchanges between a client (e.g., the reader controller) and a server (e.g., the test tool) during test execution. Before the test process starts, the server can prepare the list of Test_IDs to run. The list of Test_IDs to run can depend on the type of run the tester prefers. The tester may select single run and execute a single test case (run-one-by-one), or batch run and execute the full batch of test cases (run-full-batch). In other embodiments, the tester may select a subset of test cases from the full batch. The steps shown in FIGS. 4-5, as well as in FIGS. 6-7 can be combined with the steps described above with respect to FIGS. 1-2.

A Test_ID can adapt a test cycle that minimally consists of three states. One state is "begin", a beginning state, where the Test_ID have never been sent or have never been completed. Another state is "sent", a sent state is where the server receives a Start-of-Transaction message and this Test_ID have been sent to the client. Another state is "completed", a completed state is when the server receives an End-of-Transaction message for the Test_ID and the response status code is 200 (OK). When the server has exhausted the list of Test_IDs (e.g., no more test cases to run), the server can respond to a start-of-transaction message with a 204 status code.

FIG. 4 shows the message flow for a single run of a test case. In step 402, a user can identify a single Test_ID to run.

In step 404, the client can send a STXN request message to the server.

In step 406, the server can reply with the Test_ID in a STXN response with a status code of 200, and flag the Test_ID as sent.

In step 408, the client can send an ETXN request message to the server.

In step 410, the server can reply with an ETXN response with a status code of 200, and mark the Test_ID as completed.

In step 412, the client can send another STXN request message to the server.

In step 414, the server can send an ETXN response message with a status code of 204, indicating that there are no more test cases to run.

FIG. 5 shows the message flow for a batch run of a plurality of test cases. In step 502, the server can prepare a list of Test_IDs to run.

In step 504, the client can send a STXN request message to the server.

In step 506, the server can reply with the next Test_ID in a STXN response with a status code of 200, and flag the Test_ID as sent.

In step 508, the client can send an ETXN request message to the server.

In step 510, the server can reply with an ETXN response with a status code of 200, and mark the current Test_ID as completed.

Steps 504-510 can then be repeated multiple times, until all test cases have been executed.

In step 512, the client can send another STXN request message to the server.

In step 514, if there are no Test_IDs that are not marked as completed, the server can send an ETXN response message with a status code of 204, indicating that there are no more test cases to run.

In some embodiments, the test tool has an option for users to enable a Stop-On-Error function. This functionality enables the test tool to "pause" the test process when the access device has failed a test. This enables the user to investigate the cause of failure before resuming the test process. When a test process is paused, the test tool can store the test case context so that the process can continue to the next test case when resumed.

When Stop-On-Error function is enabled and a verdict for the last test case is a FAIL, the server can reply with a 204 status code. A 204 status code can make the client application stop or pause the test process. When the client application start the test process again, the server responds with the next Test_ID that has state==begin. If the test verdict is not yet available (e.g., for a test case that requires extra Visual Check(s)), the server may reply with "Server is Busy" 408 return code.

Figure 6:
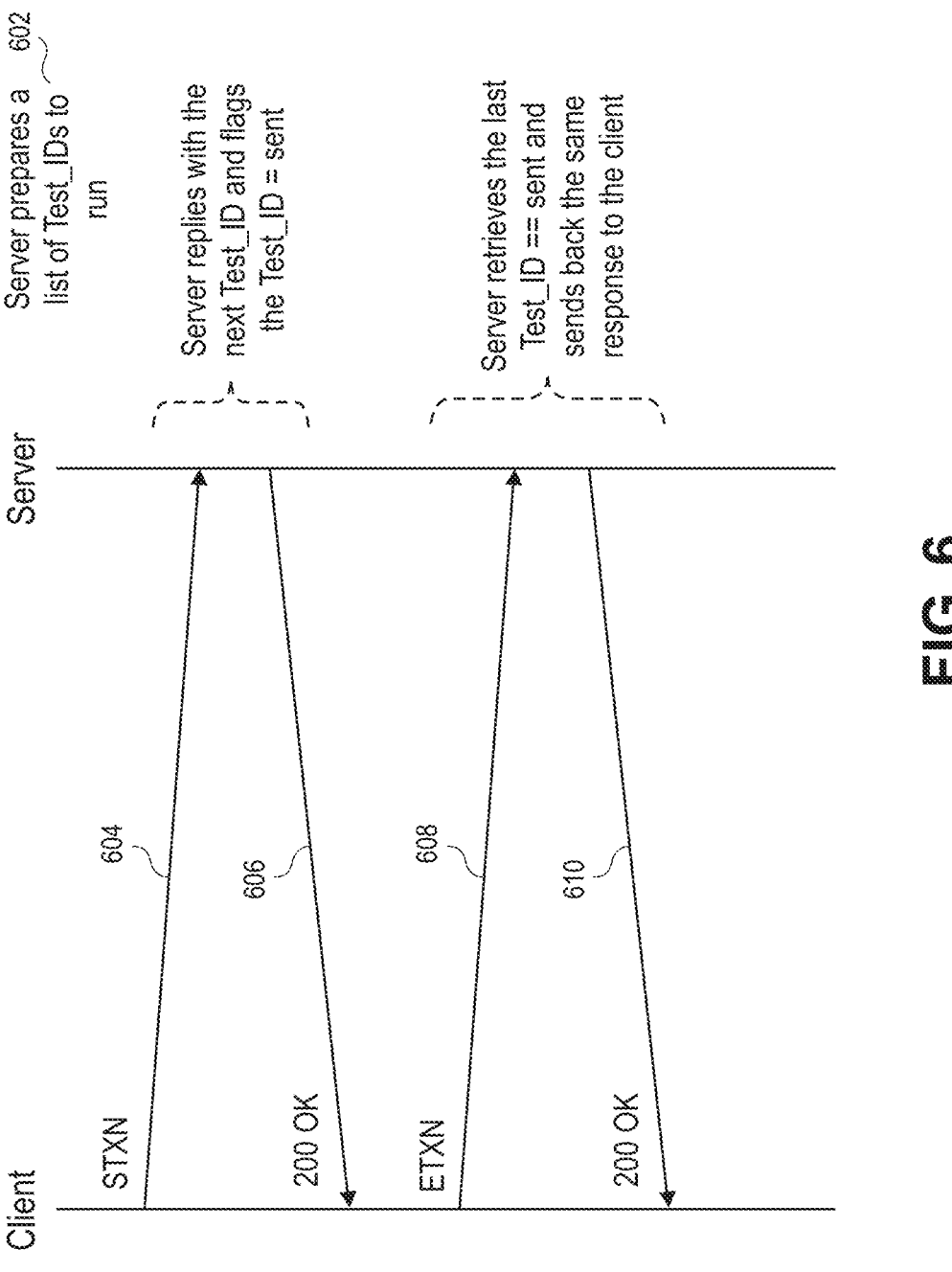
FIG. 6 shows a message flow for multiple start of transaction messages according to embodiments.
Figure 7:
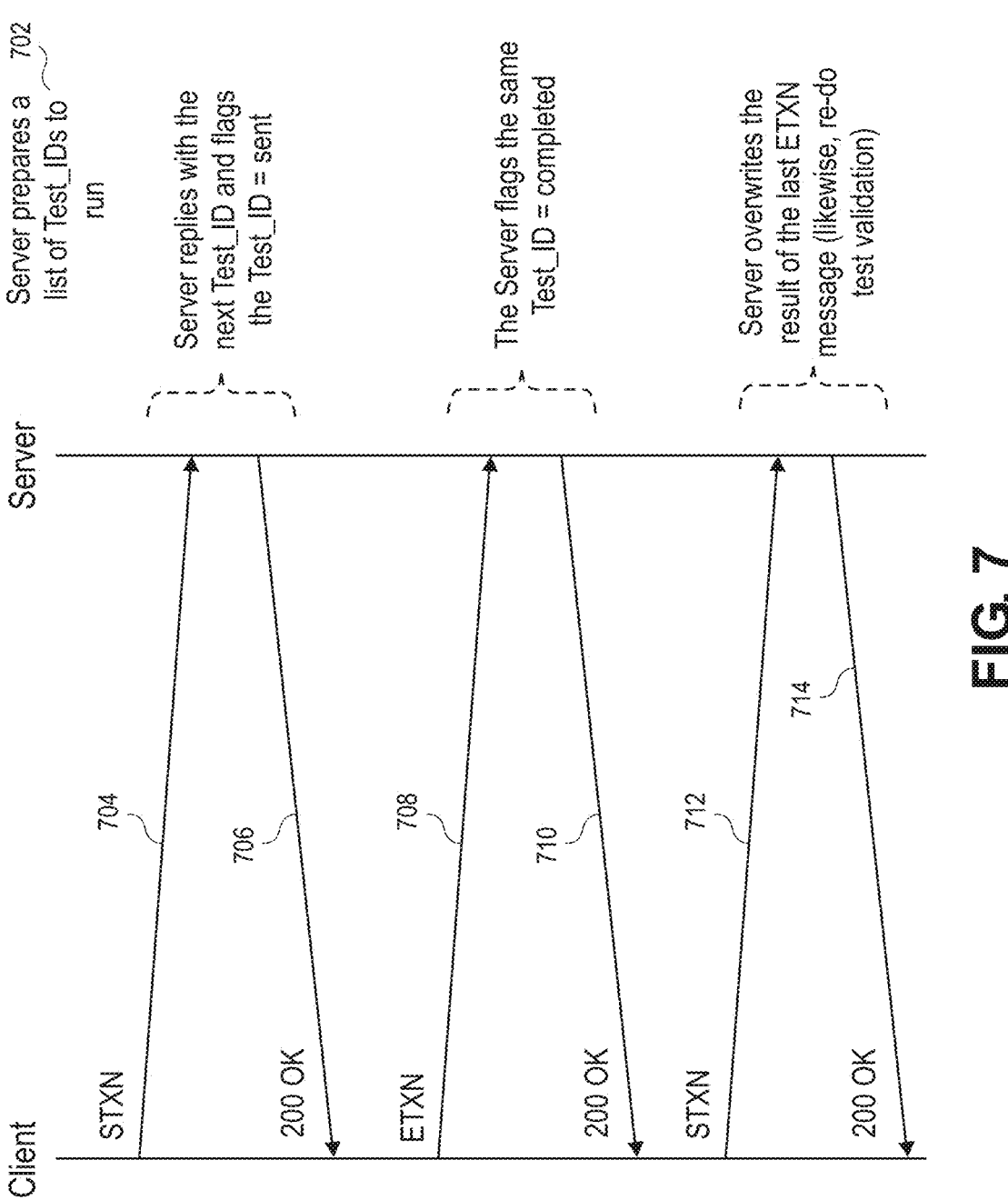
FIG. 7 shows a message flow for multiple end of transaction messages according to embodiments.

In some embodiments, a client may send multiple start of transaction messages before receiving an end of transaction message. FIG. 6 shows the message flow when multiple start of transaction messages are sent.

In step 602, the server can prepare a list of Test_IDs to run.

In step 604, the client can send a STXN message to the server.

In step 606, the server can reply with the next Test_ID and flag the Test_ID as sent.

In step 608, the client can send another STXN message to the server.

In step 610, the server can retrieve the last Test_ID with a status of "sent" and reply with the same response message as in step 606.

In other embodiments, multiple ETXN messages may be received without an intervening STXN message. In this case, the server can check that the Test_ID is the same with the last Test_ID (where last message is ETXN message). If the Test_ID is the same, the server can overwrite the transaction outcome from the new ETXN message and shall invoke the test tool to redo validation of the test.

In step 702, the server can prepare a list of Test_ID to run.

In step 704, the client can send a STXN message to the server.

In step 706, the server can reply with the next Test_ID and flag the Test_ID as sent.

In step 708, the client can send an ETXN message to the server.

In step 710, the server can reply with an ETXN response with a status code of 200, and mark the current Test_ID as completed.

In step 712, the client can send another ETXN message to the server.

In step 714, the server can overwrite the results of the last ETXN message with the results of the new ETXN message. The server can also redo the associated test validation.

In some embodiments, the client may send an ETXN message with a Test_ID that does not match the Test_ID of the last received STXN message. After the server receives such an ETXN message, it can respond with a 400 status code indicating a bad request format.

Figure 8:
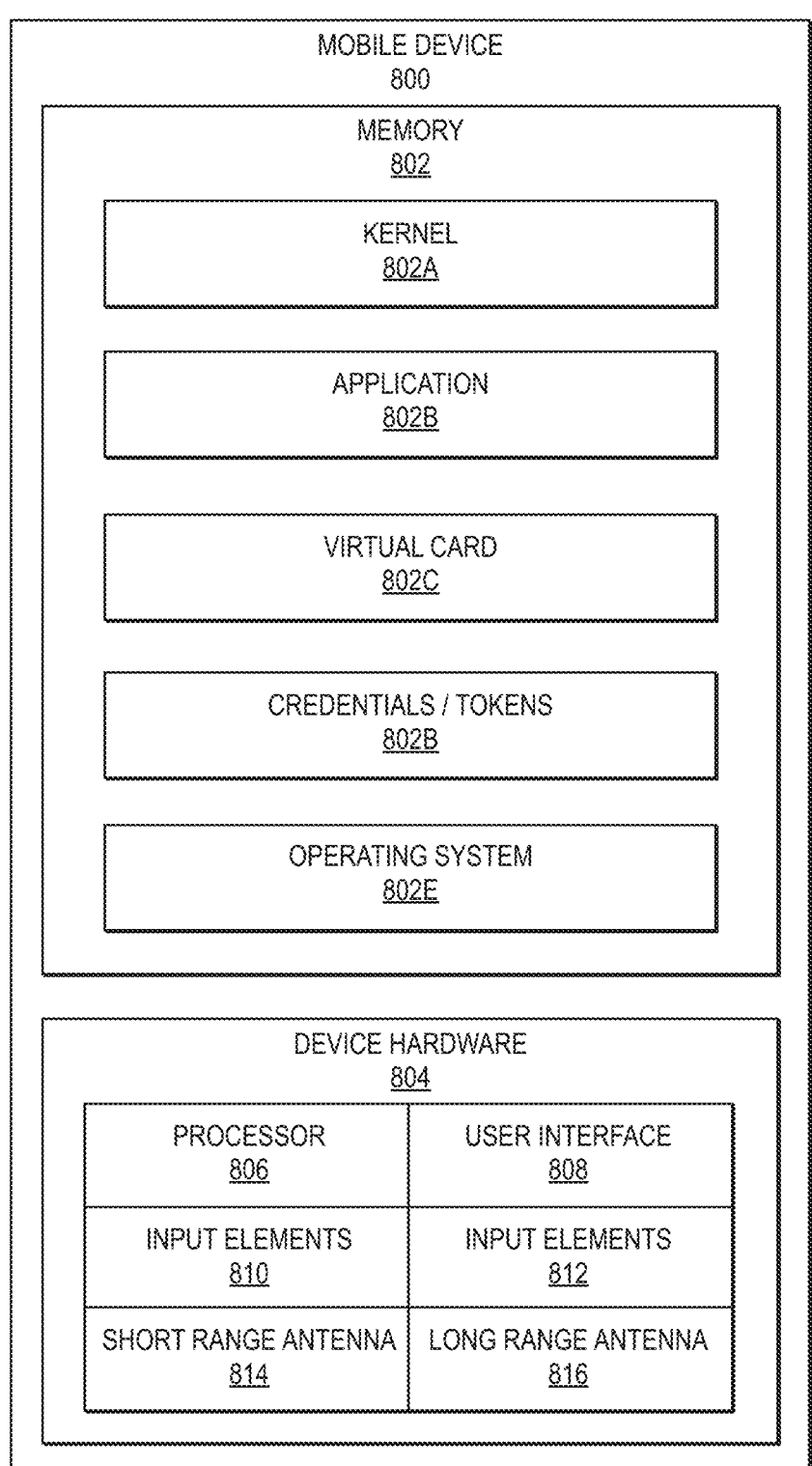
FIG. 8 shows a mobile device with components that can be present in an access device or a test tool.

FIG. 8 illustrates a mobile communication device 800 according to an embodiment. Mobile communication device 800 may include device hardware 804 coupled to a system memory 802 which may include a computer readable medium 802.

Device hardware 804 may include a processor 806, a short range antenna 814, a long range antenna 816, input elements 810, a user interface 808, and output elements 812 (which may be part of the user interface 808). Examples of input elements may include microphones, keypads, touchscreens, sensors, etc. Examples of output elements may include speakers, display screens, and tactile devices. The processor 806 can be implemented as one or more integrated circuits (e.g., one or more single core or multicore microprocessors and/or microcontrollers), and is used to control the operation of mobile communication device 800. The processor 806 can execute a variety of programs in response to program code or computer-readable code stored in the system memory 802, and can maintain multiple concurrently executing programs or processes.

The long range antenna 816 may include one or more RF transceivers and/or connectors that can be used by mobile communication device 800 to communicate with other devices and/or to connect with external networks. The user interface 808 can include any combination of input and output elements to allow a user to interact with and invoke the functionalities of mobile communication device 800.

The short range antenna 814 may be configured to communicate with external entities through a short range communication medium (e.g. using Bluetooth, Wi-Fi, infrared, NFC, etc.). The long range antenna 814 may be configured to communicate with a remote base station and a remote cellular or data network, over the air.

The system memory 802 can be implemented using any combination of any number of non-volatile memories (e.g., flash memory) and volatile memories (e.g. DRAM, SRAM), or any other non-transitory storage medium, or a combination thereof media. The system memory 802 may store computer code, executable by the processor 806, for performing any of the functions described herein. For example, the system memory 802 may comprise a computer readable medium comprising code, executable by the processor 806, for implementing the methods described herein for the test tool and/or the access device.

The system memory 802 may also store a kernel 802A, an application 802B, a virtual device such as a virtual card 802C, credentials/tokens 802D, and an operating system 802E.

The kernel 802A may be a contactless kernel. The kernel 802A could be within the application 802B or external to it. It may provide the basic functionality for the application 802B. For example, the kernel 802A may provide code for certain responses that are produce or actions that are performed in response to messages that are received by the kernel 802A.

The application 802B may be an access application in the case of an access device, or a testing application in the case where the mobile device 800 is a testing tool. The access application can be a contactless application, which allows the mobile device 800 to behave like an access device that can receive and process data from a contactless portable device such as a contactless card (e.g., a contactless payment card). The access device could be a POS terminal, a transit terminal, a data access terminal, or the like. If the mobile communication device 802 is an access device, then the application 802B can include code for reading and processing data from portable devices, generating authorization request messages from data received from portable devices, transmitting authorization request messages to authorizing entity computers, and receiving and processing authorization response messages from authorizing entity computers The virtual card 802C, which may be present when the mobile device 800 is a testing tool, may comprise code to simulate a function of a contactless card in software. The virtual card 802C and the processor 806 can behave like the previously described physical reprogrammable card or a probe. The virtual card 802C and the processor 806 can receive messages from the test computer in a network-based protocol and then convert them to an APDU message format that would be compatible with NFC data transmissions.

System memory 802 may also store credentials and/or tokens 802D when the mobile device 800 is in the form of a testing tool. Credentials may also include information identifying the mobile communication device 800 and/or the user of the mobile communication device 800. Examples of credentials may include a public key associated with the mobile communication device 800 and/or a user of the mobile communication device 800, a digital signature (e.g., the public key of the mobile communication device 800 signed by a key of the authentication system), payment credentials, biometric data (e.g., biometric samples or templates), etc.

Embodiments of the invention have a number of advantages. As noted above, embodiments of the invention can allow for the rapid testing of hundreds or even thousands of test scenarios with respect to an access application to be deployed to an access device. This can be done without any movement of either the access device or a testing tool that tests the access device. Further, a testing application can be downloaded to a test tool, thereby allowing the test tool to communicate with a test portal that has various test plans with test scenarios, and a reader controller that will control the access device to be tested. Thus, embodiments allow for a resource provider such as a merchant to simply download the testing application to a mobile phone and also download an access application to another mobile phone. These two phones can be used to verify the operation of the access application.

Another embodiment includes a method comprising: receiving, by a reader controller; a configuration file configuration data; providing, by the reader controller, a configuration command associated with configuration data to an access application on an access device, which configures the access application on the access device for an interaction scenario based on the configuration command; initiating the interaction scenario between the access device and a test tool, the access device receiving interaction data from the test tool, processing the interaction data, and generating test output data; receiving the test output data from the access device; and sending, by the reader controller, the test output data to the test tool, which compares the test output data to expected output data to determine if the access device is capable of conducting the interaction scenario.

Another embodiment may include the method described above, wherein the configuration file is a first configuration file, the configuration data is first configuration data, the configuration command is a first configuration command, the interaction scenario is a first interaction scenario, the test output data is first test output data, and the expected output data is first expected output data, wherein the method further comprises: determining, by the test tool, a second configuration file comprising second configuration data from the test plan; providing, by the test tool, the second configuration file comprising the second configuration data to the reader controller, which provides a second configuration command associated with second configuration data to the access application on the access device to configure the access application for a second interaction scenario between the access device and the test tool; conducting the second interaction scenario between the access device and the test tool; receiving second test output data from the access device; and comparing the second test output data to second expected output data to determine if the access device is capable of conducting the second interaction scenario.

Another embodiment includes a method according to those above, wherein the second configuration file is sent automatically in response to receiving the first test output data.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

downloading an access application to an access device comprising a processor, a computer readable medium, and a reader device;

receiving, by the access application in the access device from a reader controller on a test computer separate from the access device, a first configuration command, after the reader controller transmits a start transaction request to a test tool comprising an NFC card emulation device via the Internet, and after the test tool sends a start transaction response to the reader controller via the Internet; and conducting at least one hundred test scenarios emulating taps of the NFC card emulation device to the reader device while the access device and the test tool remain stationary and are within one inch of each other, the at least one hundred interaction scenarios including a first interaction scenario and a second interaction scenario, the conducting including, configuring, by the access device, the access application in the access device for the first interaction scenario based on the first configuration command received from the reader controller, receiving, by the reader device in the access device from the reader controller, a first signal to turn on the reader device in the access device to initiate the first interaction scenario, thereby emulating a first tap of the NFC card emulation device to the reader device, initiating, by the access device, the first interaction scenario between the access device and the test tool comprising a testing application, receiving, by the access device, first interaction data from the test tool via NFC, wherein the first interaction data comprises first transaction data, the first transaction data comprising data values associated with one or more first transactions, processing, by the access device, the first interaction data, thereby generating a first test output data, providing, by the access device, the first test output data to the reader controller, which sends the first test output data to the test tool via the Internet, wherein the first test output data is compared to first expected output data to determine if the access device is capable of conducting the first interaction scenario, receiving, by the reader device in the access device from the reader controller, a second signal to turn off the reader device in the access device, receiving, by the access application in the access device from the reader controller, a second configuration command, configuring, by the access device, the access application in the access device for the second interaction scenario based on the second configuration command received from the reader controller, receiving, by the reader device in the access device from the reader controller, a third signal to turn on the reader device in the access device to initiate the second interaction scenario, thereby emulating a second tap of the NFC card emulation device to the reader device, initiating, by the access device, the second interaction scenario between the access device and the test tool, receiving, by the access device via NFC, second interaction data from the test tool, processing, by the access device, the second interaction data, thereby generating second test output data, and providing, by the access device, the second test output data to the reader controller, which sends the second test output data to the test tool via the Internet, wherein second the test output data is compared to second expected output data to determine if the access device is capable of conducting the second interaction scenario, wherein the access device and the test tool are remotely located with respect to the test computer comprising the reader controller, and wherein the reader device is an NFC (near field communications) reader device.

2. The method of claim 1, wherein the access device is a first mobile phone and the test tool is a second mobile phone.

3. The method of claim 1, wherein the first interaction scenario is part of a test plan that contains a plurality of interaction scenarios.

4. The method of claim 1, wherein the NFC card emulation device emulates operations of an access card.

5. The method of claim 1, wherein the first interaction scenario comprises passing a plurality of APDU (application protocol data unit) messages between the access device and the test tool.

6. The method of claim 1, wherein the first interaction scenario is present in a test plan that is received by the reader controller via the testing application on the test tool.

7. The method of claim 1, further comprising:

conducting at least one thousand test scenarios using the test tool and the access device without moving the test tool and the access device.

8. The method of claim 1, wherein the reader controller sends an echo request to the test tool and receives an echo response from the test tool, before the configuring for the first interaction scenario.

9. The method of claim 1, wherein the first interaction data comprise a credential, an amount, a date, and/or a time.

10. The method of claim 1, wherein the access device is a point of sale terminal and the test tool is a mobile phone.

11. The method of claim 1, wherein the first and the second interaction scenarios use APDU (application protocol data unit) commands.

12. The method of claim 1, wherein the first interaction data comprises a simulated PAN (primary account number).

13. The method of claim 1, wherein configuring, by the access device, the access application in the access device for the first interaction scenario based on the first configuration command received from the reader controller comprises inputting values into data fields and turning on or off routines in the access application.

14. The method of claim 1, wherein configuring, by the access device, the access application in the access device for the first interaction scenario based on the first configuration command received from the reader controller comprises modifying code in the access application.

15. The method of claim 1, wherein the reader controller and the test tool communicate using an HTTP (HyperText Transfer Protocol) connection.

16. An access device comprising:

a processor;

a reader device coupled to the processor; and a non-transitory computer readable medium coupled to the processor, the non-transitory computer readable medium comprising code, executable by the processor to cause the process to perform operations including:

downloading an access application;

receiving, by the access application from a reader controller on a test computer separate from the access device, a first configuration command, after the reader controller transmits a start transaction request to a test tool via the Internet, and after the test tool comprising an NFC card emulation device sends a start transaction response to the reader controller via the Internet; and conducting at least one hundred test scenarios emulating taps of the NFC card emulation device to the reader device while the access device and the test tool remain stationary and are within one inch of each other, the at least one hundred interaction scenarios including a first interaction scenario and a second interaction scenario, the conducting including, configuring the access application in the access device for the first interaction scenario based on a configuration command received from the reader controller, receiving, by the reader device in the access device from the reader controller, a first signal to turn on the reader device in the access device to initiate the first interaction scenario, thereby emulating a first tap of the NFC card emulation device to the reader device, initiating by the access device, the first interaction scenario between the access device and the test tool comprising a testing application, receiving first interaction data from the test tool via NFC, wherein the first interaction data comprises first transaction data, the first transaction data comprising data values associated with one or more first transactions, processing the first interaction data, thereby generating first test output data, providing the first test output data to the reader controller, which sends the first test output data to the test tool via the Internet, which compares first test output data to first expected output data to determine if the access device is capable of conducting the first interaction scenario, receiving, by the reader device in the access device from the reader controller, a second signal to turn off the reader device in the access device, receiving, by the access application in the access device from the reader controller, a second configuration command, configuring the access application in the access device for the second interaction scenario based on the second configuration command received from the reader controller, receiving, by the reader device in the access device from the reader controller, a third signal to turn on the reader device in the access device to initiate the second interaction scenario, thereby emulating a second tap of the NFC card emulation device to the reader device, initiating the second interaction scenario between the access device and the test tool, receiving, via NFC, second interaction data from the test tool, processing the second interaction data, thereby generating second test output data, and providing, by the access device, the second test output data to the reader controller, which sends the second test output data to the test tool via the Internet, wherein the second test output data is compared to second expected output data to determine if the access device is capable of conducting the second interaction scenario, wherein the access device and the test tool are remotely located with respect to the test computer comprising the reader controller, and wherein the reader device is an NFC (near field communications) reader device.

17. The access device of claim 16, wherein the access device is a mobile phone.

18. A method comprising:

receiving, by a test tool comprising an NFC card emulation device, a test plan;

storing, by the test tool, the test plan;

determining, by the test tool, a configuration file comprising configuration data from the test plan;

providing, by the test tool, the configuration file comprising the configuration data to a reader controller on a test computer via the Internet, which provides a first configuration command associated with first configuration data to an access application on an access device comprising an NFC reader device that is separate from the test computer to configure the access application for a first interaction scenario between the access device and the test tool, after the reader controller transmits a start transaction request to the test tool via the Internet, and after the test tool sends a start transaction response to the reader controller via the Internet; and conducting at least one hundred test scenarios emulating taps of the NFC card emulation device to the NFC reader device in the access device while the access device and the test tool remain stationary and are within one inch of each other, the at least one hundred interaction scenarios including the first interaction scenario and a second interaction scenario, the conducting including, initiating, by the test tool, the first interaction scenario between the access device and the test tool, providing, by the test tool, first interaction data to the access device, wherein the first interaction data comprises first transaction data, the first transaction data comprising first data values associated with one or more first transactions,;

receiving, by the test tool from the reader controller via the Internet, first test output data, wherein the first test output data is compared to first expected output data to determine if the access device is capable of conducting the first interaction scenario, providing, by the test tool, a second configuration file for configuring the access application in the access device for the second interaction scenario to the reader controller via the Internet, which provides a second configuration command to the access application in the access device, providing, by the test tool to the access device, second interaction data for the second interaction scenario via NFC, and receiving, by the test tool from the reader controller via the Internet, second test output data, wherein the second test output data is compared to second expected output data to determine if the access device is capable of conducting the second interaction scenario, wherein the access device and the test tool are remotely located with respect to the test computer comprising the reader controller, and wherein the access device comprises the NFC reader device, a processor coupled to the NFC reader device, and a computer readable medium coupled to the processor, and wherein the reader controller sends a first signal to the NFC reader device to turn off after the first interaction scenario is completed, and sends a second signal to the NFC reader device to turn on the NFC reader device to start the second interaction scenario, thereby emulating a tap of the NFC card emulation device to the reader device, and wherein the reader device is an NFC (near field communications) reader device.

19. The method of claim 18, wherein the test tool is a mobile phone.

20. The method of claim 18, wherein the test tool comprises a test application, which communicates with a test portal to receive the test plan and the reader controller.

* * * * *